United States Patent
Ogawa et al.

(10) Patent No.: US 6,669,452 B2
(45) Date of Patent: Dec. 30, 2003

(54) COMPRESSOR WITH BUILT-IN MOTOR MOUNTED ON ENGINE OF MOBILE STRUCTURE

(75) Inventors: Nobuaki Ogawa, Otsu (JP); Yoshifumi Abe, Ritto (JP); Masahiko Makino, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/096,287

(22) Filed: Mar. 13, 2002

(65) Prior Publication Data

US 2002/0131878 A1 Sep. 19, 2002

(30) Foreign Application Priority Data

Mar. 14, 2001 (JP) ........................................ 2000-071735

(51) Int. Cl.[7] .............................. F04B 17/00; F04B 35/00
(52) U.S. Cl. ................... 417/360; 417/363; 417/423.14
(58) Field of Search ................................ 417/360, 363, 417/902, 313, 423.5, 410.1, 423.14, 321; 62/323.3

(56) References Cited

U.S. PATENT DOCUMENTS

| | | | | |
|---|---|---|---|---|
| 4,600,367 A | * | 7/1986 | Terauchi et al. | 417/360 |
| 4,834,336 A | * | 5/1989 | Shimazaki et al. | 248/666 |
| 4,938,448 A | * | 7/1990 | Shimazaki | 248/635 |
| 4,964,786 A | * | 10/1990 | Maertens | 417/363 |
| 5,145,330 A | * | 9/1992 | Uchiyama | 417/363 |
| 6,217,297 B1 | * | 4/2001 | Tsumagari et al. | 417/360 |
| 6,283,729 B1 | * | 9/2001 | Makino et al. | 417/410.3 |

FOREIGN PATENT DOCUMENTS

JP          8-93990 A     *  4/1996

* cited by examiner

Primary Examiner—Justine R. Yu
Assistant Examiner—Han L Liu
(74) Attorney, Agent, or Firm—Greenblum & Bernstein, P.L.C.

(57) ABSTRACT

Separated seating members are used to mount a compressor onto an engine of a mobile structure. The compressor has a compressing mechanism and an electric motor, which are accommodated in a case, and the separated seating members embrace and fix the case by mutually linking together. Mounting seats provided on the separated seating members are held against the engine, and are mounted by bolts.

10 Claims, 5 Drawing Sheets

COMPRESSOR WITH BUILT-IN MOTOR MOUNTED ON ENGINE OF MOBILE STRUCTURE

The present disclosure relates to subject matter contained in priority Japanese Patent Application No. 2001-71735, filed on Mar. 14, 2001, the contents of which is herein expressly incorporated by reference in its entirety.

BACKGROUND OF THE INVENTION

1. Field of the Invention

The present invention relates to a compressor with a built-in electric motor suitable for mounting on an engine of a vehicle, in particular suitable for a hybrid vehicle.

2. Description of Related Art

In a vehicle driven only by an engine, a compressor driven by the engine has been used for air-conditioning the vehicle compartment with the compressor being mounted alongside of the engine.

Hybrid vehicles having both an engine and an electric motor and traveling by use of one of them according to conditions have been practically used in recent times. In the hybrid vehicles, air-conditioning of the vehicle compartment is made by a refrigerating compressor driven by and mounted alongside the engine.

It is proposed that the engines of hybrid vehicles should be shut off while they are temporarily stationary at a place such as a traffic light in order to reduce effects of the engine upon the environment. When the proposal is followed with a vehicle where a compressor driven by the engine is used, air-conditioning stops each time when the vehicle stops, causing problem for the driver and passengers in the compartment in summer and winter seasons, and especially in regions with extremely cold or hot climate.

Consequently, it is conceivable to adopt a compressor driven by an electric motor, especially to adopt a compressor with built-in motor that has a compressing mechanism 101 and an electric motor 102 accommodated in a case 100, which is used for indoor air conditioners, as shown in FIG. 5. However, there is no space in the engine compartment for conventional compressors of indoor air conditioning even in these hybrid vehicles, because the arranging of devices in the engine compartment is done based on conventional automobiles, with some contrivance given to the mounting space of batteries. Therefore the compressor has to be mounted by fixing it alongside the engine, as in conventional systems.

With regard to this arrangement inside the engine compartment, the present inventors have made various experiments, and found out that when using installing legs or mounting seats 103 made of sheet-metal welded to the conventional case 100, a receiving seat corresponding to them was needed on the engine side, and it was inconvenient. The conventional mounting seat 103 did not have enough strength to withstand the weight and vibration of the compressor either, in a posture of being fixed alongside the engine, because the compressor was heavy and weighed about seven to eight kilograms. The conventional mounting seat 103 did not have enough durability either, and lacked reliability, and was prone to be damaged at its welded portion to the case 100, due to being affected by the vibration of the engine. It is conceivable to insert an elastic member between the mounting seat 103 and the engine, to prevent the vibration of the engine from affecting the compressor, and to prevent the vibration of the compressor from affecting the passenger compartment. Since the mounting locations of the mounting seats 103 to the engine are dispersed, the mounting locations of the elastic members are also dispersed, and the number of components and the number of processes for assembly increases, causing a rise in cost. Since the elastic members arranged in dispersion on each of the mounting portions only act upon their mounted range of area, the vibration preventing effect is weak, and when an elastic member with a small spring constant is adopted to compensate this weak effect, the elastic member is prone to be damaged between the vibrating engine and compressor.

SUMMARY OF THE INVENTION

An object of the present invention is to provide a compressor with a built-in motor that is suitable for mounting on an engine, and which has sufficient mounting strength, and is suited for preventing vibration.

To achieve the above-mentioned objects, a compressor with a built-in motor of the present invention, which is mounted on an engine of a mobile structure, includes a compressing mechanism and an electric motor for driving the compressing mechanism, the mechanism and motor being accommodated in a case, and is provided with separated seating members which have mounting seats, embrace the case and fix the compressor by mutually linking together, in which the compressor is mounted on the engine while the mounting seats of the separated seating members held against the engine.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

A compressor with a built-in motor that is mounted on an engine of a mobile structure, according to an embodiment of the invention, will be described hereinafter with reference to the drawings.

This embodiment is an embodiment of a transverse and scroll-type compressor with a built-in motor that is mounted on an engine of a hybrid vehicle. However, the invention is not limited to this type, and is effective for use in compressors accommodating compressing mechanisms of various types, such as rotary-types or reciprocal-types, and motors that drive them. In theory, it is also possible to apply an upright-type.

Figure 1:
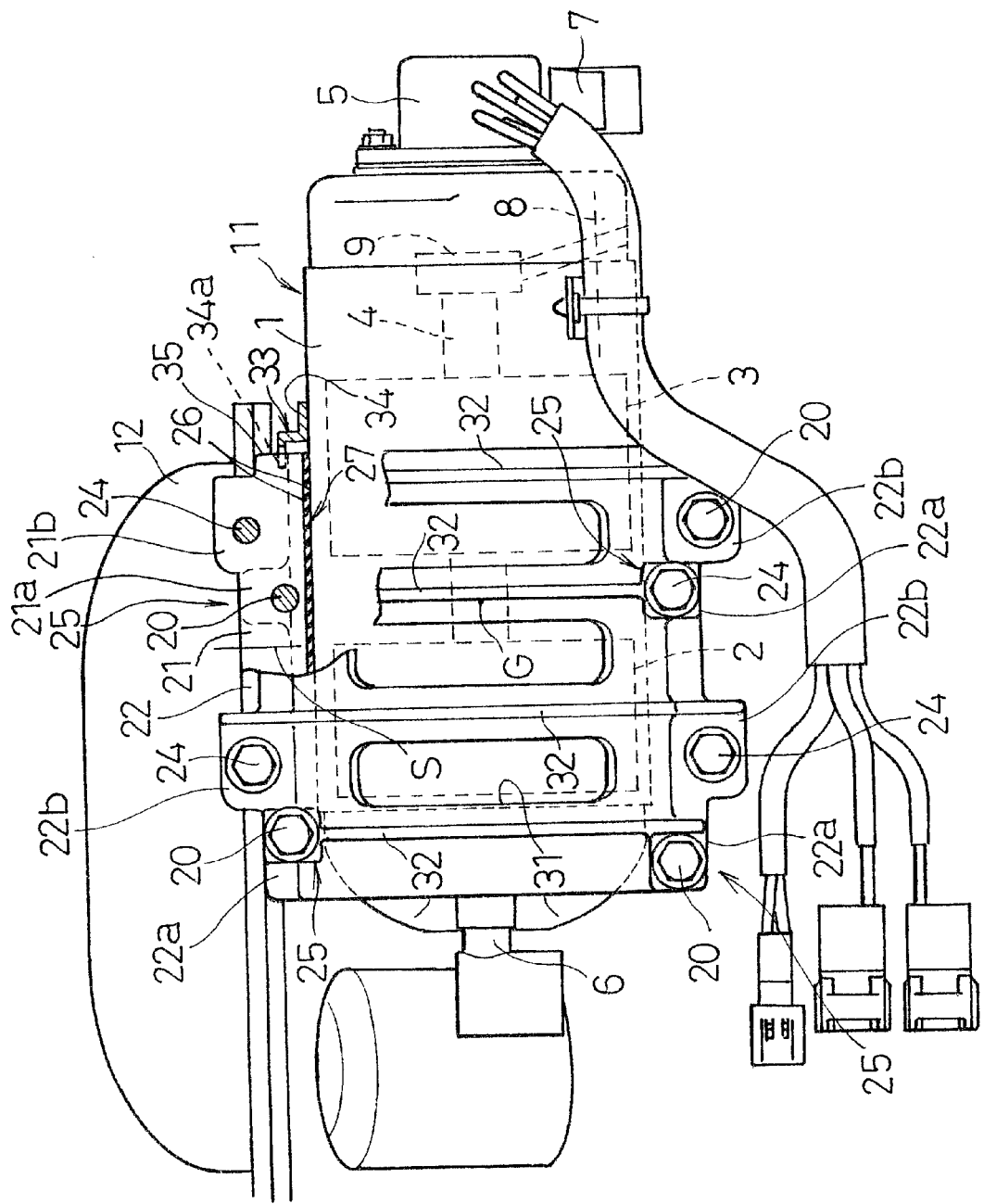
FIG. 1 is a side view showing the state of a compressor with a built-in motor mounted on an engine of a mobile structure, according to an embodiment of the invention.
Figure 2:
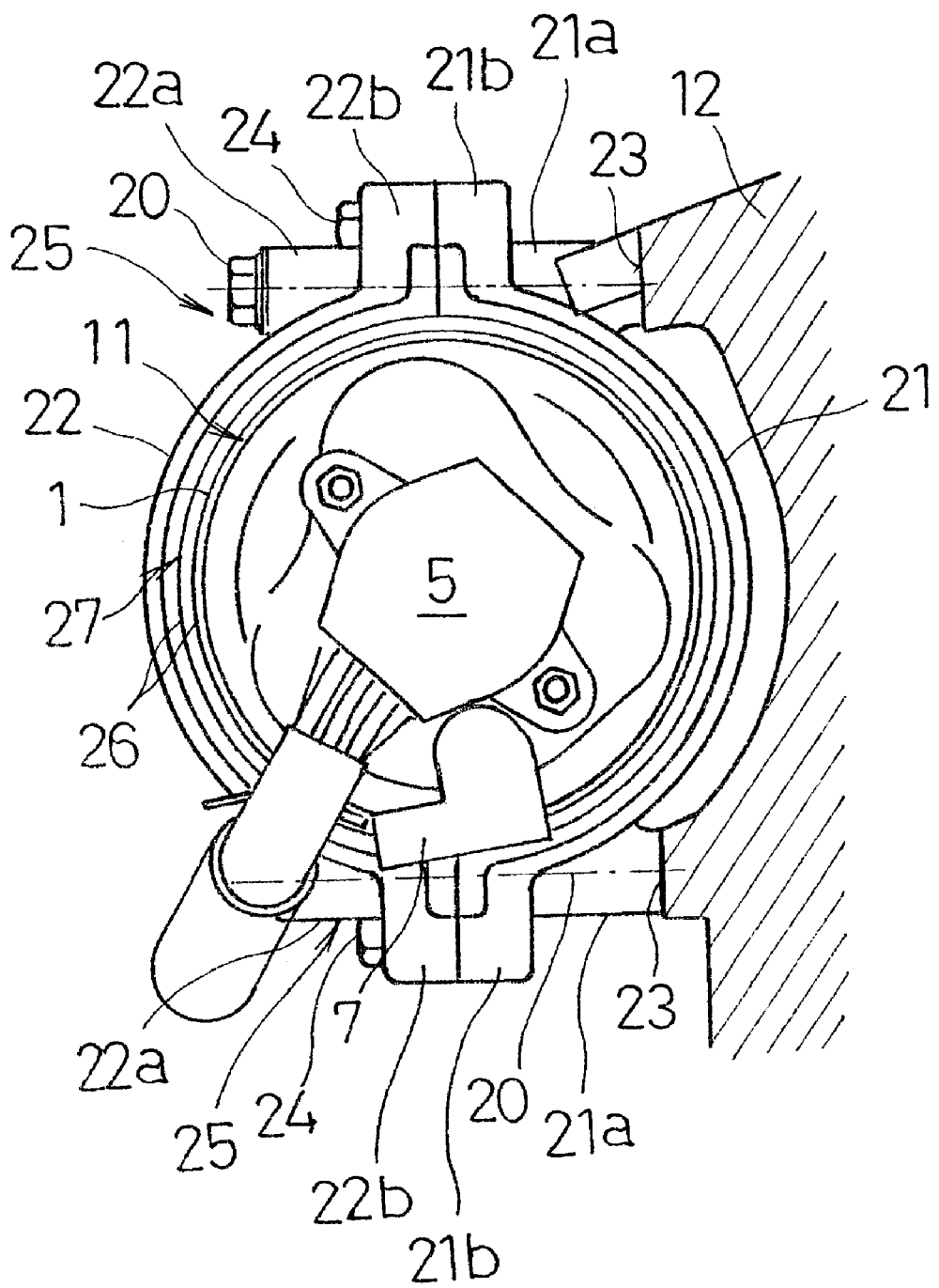
FIG. 2 is a front view of FIG. 1.

A hybrid vehicle typically has an electric motor (not shown) for driving the vehicle, besides the engine 12 that uses gasoline or the like for fuel, and the motor is made to receive electric supply from a battery (not shown) to drive the vehicle, as shown in FIG. 1 and FIG. 2. The battery is a rechargeable battery, and the hybrid vehicle is controlled such that the battery is charged while running with the engine 12, and to run with the electric motor while the charged capacity of the battery is sufficient, in order to suppress an emission of exhaust gas to a minimum. The hybrid vehicle is also controlled to have the engine 12 stop, when it temporarily stops due to traffic lights or the like.

The present embodiment provides a compressor 11 with a built-in motor, as shown in FIG. 1, for air-conditioning the passenger compartment in such a hybrid vehicle.

The compressor 11 has a scroll-type compressing mechanism 2, and an electric motor 3 that drives the compressing mechanism 2 with a crankshaft 4. The mechanism 2 and the motor 3 are accommodated in a case 1, as shown in FIG. 1. The motor 3 activates by receiving electric power supply through electric connecting terminals 5 on the inside and outside of the case 1, and drives the compressing mechanism 2. The compressing mechanism 2 sucks refrigerant, which has undergone a refrigeration cycle, through a suction pipe 6 of the case 1, and compresses it, and discharges the compressed refrigerant into the case 1 to cool the motor 3. After that, the compressing mechanism 2 discharges the refrigerant outside the case 1 through a discharge pipe 7 of the case 1, and supplies it to the refrigeration cycle of the air conditioning. This process is repeated successively.

There is oil 8 stored in the case 1, and this oil is sucked by a pump 9 driven by the crankshaft 4, and supplied to bearing portions of the crankshaft 4, or to sliding portions of the compressing mechanism 2, to lubricate these portions. Then the oil 8 after the lubrication oozes out from these portions by oil supply pressure, and returns to the inside of the case 1. This cycle is repeated. A portion of the refrigerant discharged into the case 1 accompanies the oil 8 because of its compatibility with the oil, and it lubricates portions that did not have oil 8 supplied to by the pump 9. In this way, the compressor 11 with a built-in motor of the embodiment satisfies the requirements of a maintenance free system. The weight of the compressor 11 is about seven to eight kilograms.

Figure 3:
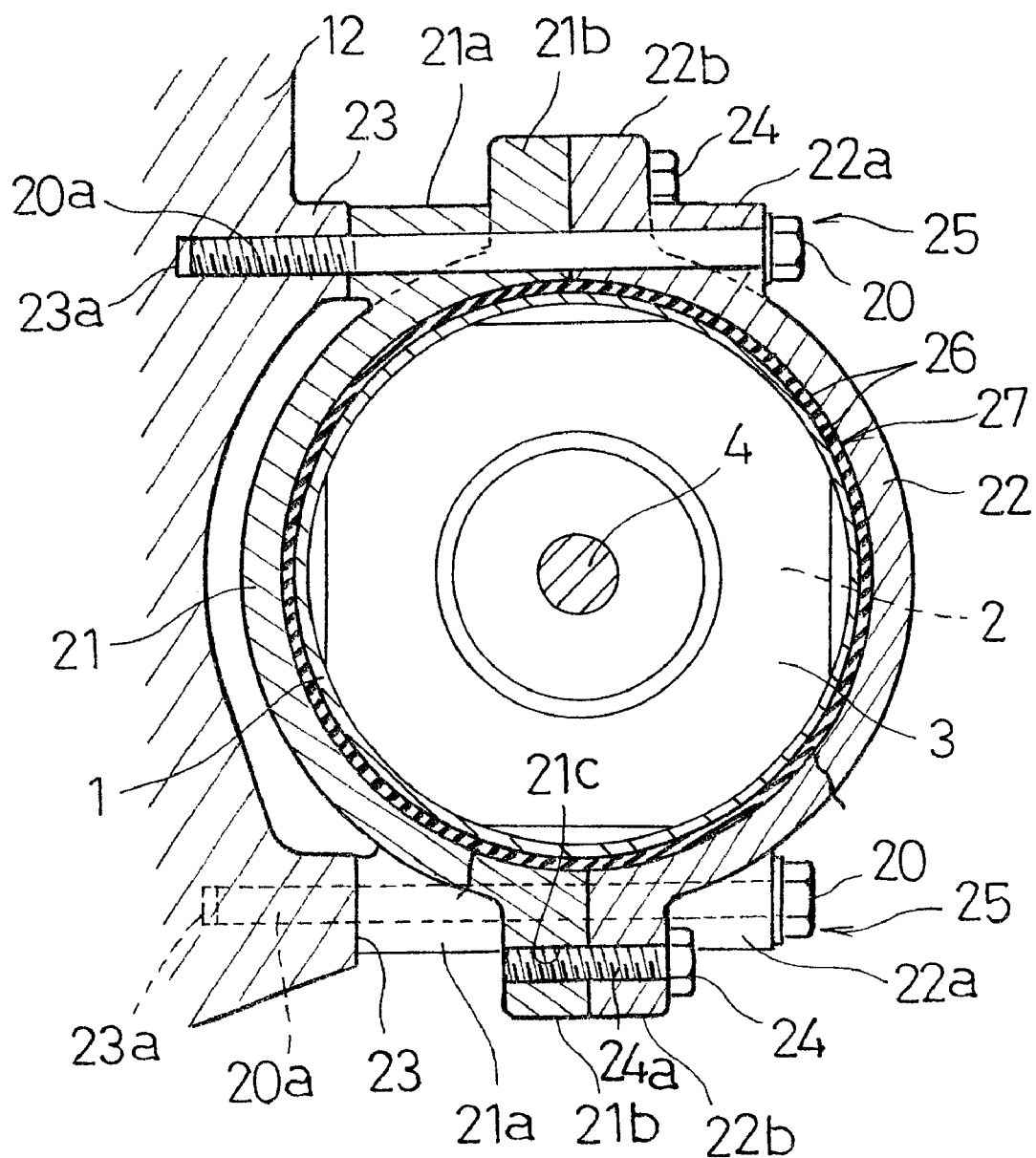
FIG. 3 is a cross sectional view of the portion where the compressor in FIG. 1 is mounted onto the engine.
Figure 4:
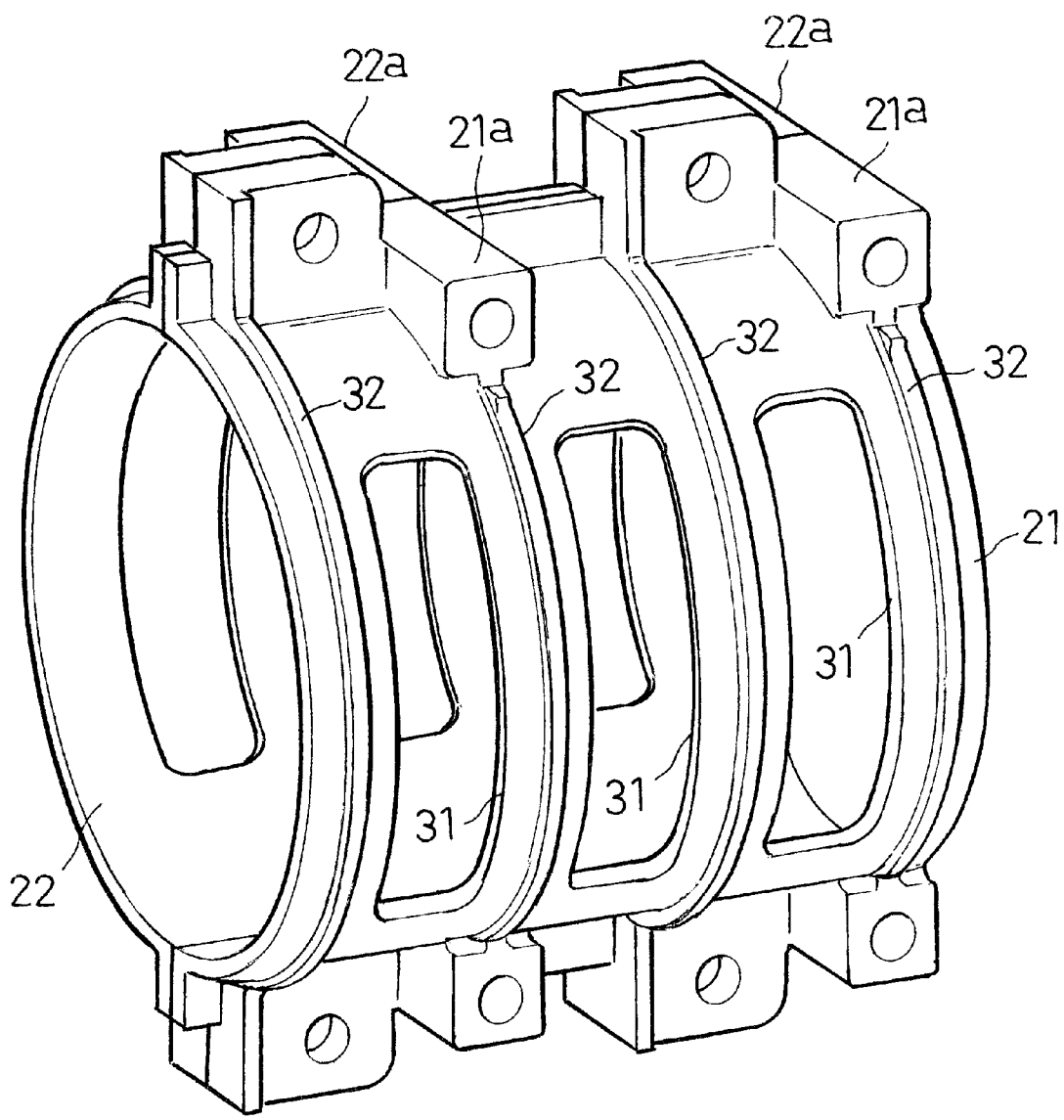
FIG. 4 is a perspective view of separated seating members used for mounting the compressor onto the engine.
Figure 5:
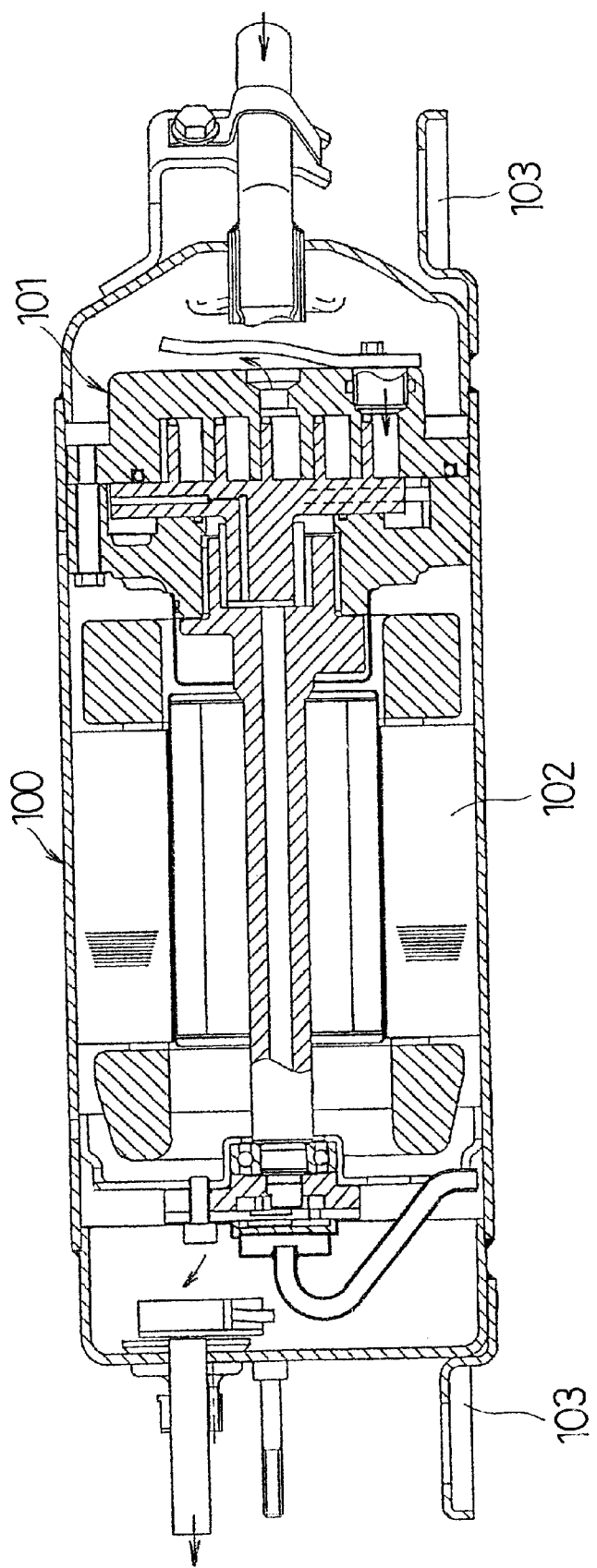
FIG. 5 is a sectional view showing a conventional compressor with a built-in motor.

In order to mount such a compressor 11 to the engine 12, the embodiment uses separated seating members 21 and 22 shown in FIG. 4, to embrace the case 1 and fix it by mutually linking together, as shown in FIG. 1 through FIG. 3. The embodiment also has the mounting seats 21a and 22a provided on the separated seating members 21 and 22, held against a receiving seat 23 of the engine 12, and mounted by bolts 20 or the like, as shown in FIG. 2 and FIG. 3.

The separated seating members 21 and 22 are different members from the case 1 of the compressor 11. The mounting seats 21a and 22a can be formed easily in the manufacturing stages, like molding the separated seating members 21 and 22 instead of the conventional mounting seats, even if the mounting seats 21a and 22a have to be newly made to correspond to the receiving seat 23 of the engine 12. Hence these mounting seats are realized at low cost. There is no need to improve the receiving seat 23 either. The separated seating members 21 and 22 need only to have a size big enough to surround the case 1 by linking together, as shown in FIG. 3, and the mounting space does not become especially bigger than conventional ones.

The separated seating members 21 and 22 embrace the case 1 and fix it with a broad surface area, just by linking each other with bolts 24 or the like, as shown in FIG. 3. Thereby, it is possible to pursue a longer life for mounting portions 25, and reliability is improved, because it is possible to achieve sufficient mounting rigidity and mounting strength, even when fixing the compressor 11 alongside the engine 12. The vibration preventing effect is improved, by having an elastic member such as a rubber sheet 27 intervened between the engine 12 and the case 1, utilizing an extensive embracement border portion 26 generated between the case 1 and the separated seating members 21 and 22. The rubber sheet 27 can be a single rubber sheet wrapped around, or can be rubber sheets affixed to the inner side surfaces of the separated seating members 21 and 22 by baking or adhesion.

It is possible to configure the number of components for the separated seating members 21 and 22 freely, but it is preferred that the seating member is separated into a minimum of two, as in the embodiment, because the linking cost and mounting cost are kept low.

In this embodiment, the separated seating members 21 and 22 are mounted onto the engine 12 by being bolted on through the mounting seats 21a and 22a, which also serve as their mutually linking portions, as shown in FIG. 1 through FIG. 3. By doing this, the mounting of the separated seating members 21 and 22 onto the engine 12 contributes to the linking together of the separated seating members 21 and 22, and the supporting rigidity and supporting strength of both the separated seating members 21, 22 and the case 1, to the engine 12 is improved.

In this embodiment, the separated seating members 21 and 22 are linked together by bolts 24, and mounted onto the engine 12 by bolts 20, but the bolting on with the bolts 24 can be omitted, and both the construction and the operation of the mounting are made even simpler.

In this case, the bolt 20 has its threaded portion 20a, which screws together with a threaded hole 23a provided in the receiving seat 23, protruding through flanges 21b and 22b. Accordingly, when a nut is screwed together onto the protruding threaded portion 20a, it is possible to maintain the linked state of the separated seating members 21 and 22, and the embraced and fixed state of the compressor 11. The nut can be taken off, when mounting the compressor 11 onto the engine 12. However, the separated seating members 21 and 22 may be handled as a unit in a linked state, by temporarily holding them together using a clip or the like. The temporary holding together can also be done by putting them in a mildly tightened-together state using an elastic belt or strings, without using the clip.

There is a plurality of mounting portions 25 for mounting onto the engine 12, two in this embodiment, which utilizes the mounting seats 21a and 22a of the separated seating members 21 and 22, provided side by side in the crosswise direction. The center of gravity of the case 1 accommodating the compressing mechanism 2 and the motor 3, is located at a location approximately corresponding to the center S of the plurality of mounting portions 25, as shown in FIG. 1. By having this constitution, the plurality of mounting portions 25 share the weight and support the case 1 equally, and make the mounting state of the compressor 11 stable for a longer period of time.

The two mounting seats 21a and 22a that become the mounting portions 25 are provided symmetrically on the upper and lower portions of the separated seating members 21 and 22, and the flanges 21b and 22b with holes for linking together are also provided in a vertically symmetrical state. The holes for linking together are linking portions that link together the separated seating members 21 and 22 using the bolts 24. In this construction, the bolts 24 are pierced from the separated seating member 22 side to the separated seating member 21 side, in all of the four holes for linking together, and link the separated seating members together by screwing together the threaded portions 24a of the bolts 24 to the threaded holes 21c of the linking holes of the separated seating member 21, as shown in FIG. 3.

By doing so, nuts will not be needed in linking together the separated seating members 21 and 22 with the bolts 20. However, since the linking holes of the separated seating member 21 become the threaded holes 21c, and the linking holes of the separated seating member 22 become unthreaded holes, the separated seating member 21 and the separated seating member 22 become different types even though having the same shape, because one has threaded holes while the other has unthreaded holes. Consequently, completely the same components can be used for both of the separated seating members 21 and 22, when the bolt 20 on the upper portion is inserted from the separated seating member 21 side to the separated seating member 22 side and screwed on, and the bolt 20 on the lower portion inserted from the separated seating member 22 side to the separated seating member 21 side and screwed on. This cuts the number of types of components in half, which reduces cost. It is most preferred that the mounting structure of the bolt 20 is also used for linking together the separated seating members 21 and 22, because both of the separated seating members 21 and 22 use the same component, and the number of bolts, and the number of operations for bolting on are reduced by half.

The separated seating members 21 and 22 are made of aluminum alloy. This contributes to an improvement in the moving characteristics of a vehicle, because weight reduction is pursued while satisfying supporting rigidity and supporting strength sufficiently at the same time. Although there are apertures 31 for weight reduction and ribs 32 for reinforcement provided on the separated seating members 21 and 22, there are various methods of reducing weight while maintaining the necessary rigidity and strength.

There is a latch portion 33 provided between the separated seating members 21 and 22, and the case 1, which latches them mutually in a prescribed direction, as shown in FIG. 1. The latch portion 33 includes a latch fitting 34 that is fixed to the outer surface of the case 1 by welding or the like, and a protruding piece 35 for latching that latches to a crotch portion 34a at the front end of the latch fitting 34, in the axial direction. But the latch portion 33 can be constituted in any other way. By composing in this way, the direction of the case 1 relative to the separated seating members 21 and 22 around the axis becomes constant, hence the following is prevented. That is, the mounting direction of the case 1 relative to the separated seating members 21 and 22, or to the engine 12 becomes an inappropriate direction, the case 1 rotating after being mounted affects the surroundings, and the fixed state of the case 1 by the embracement of the separated seating members 21 and 22 becomes loose, or the orientation becomes inappropriate.

According to the invention, as is apparent from the above descriptions, the separated seating members are different members from the case of the compressor with a built-in motor, and are formed easily in the manufacturing stages, like molding the separated seating members instead of the conventional mounting legs, and are mounted without improving the receiving seat on the engine side. In addition, the separated seating members need only to have a size big enough to surround the case by mutually linking together, and their mounting space does not become especially bigger than conventional ones. The separated seating members embrace the case of the compressor and fix it with an extensive surface area, just by mutually linking together. Thereby, it is possible to pursue a longer life for the mounting portions, and reliability is improved, because it is possible to achieve sufficient mounting rigidity and mounting strength, even when fixing the compressor alongside the engine.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A compressor mounted onto an engine of a mobile structure, comprising:

a compressing mechanism;

an electric motor for driving the compressing mechanism;

a case for accommodating the compressing mechanism and the motor; and a plurality of separated seating members for embracing and fixing said case by mutually linking together, the separated seating members including mounting seats, wherein said compressor is mounted onto the engine while holding the mounting seats against the engine.

2. The compressor according to claim 1, wherein an elastic member is provided between the separated seating members and the case.

3. The compressor according to claim 1, wherein the separated seating members are separated into two portions.

4. The compressor according to claim 1, wherein the separated seating members are mounted onto the engine by being bolted on by bolts piercing their mutually linking portions.

5. The compressor according to claim 1, wherein the linking of the separated seating members, and the mounting of the mounting seats onto the engine are done using separate bolts.

6. The compressor according to claim 1, wherein the linking of the separated seating members, and the mounting of the mounting seats onto the engine are done sharing the same bolts.

7. The compressor according to claim 1, wherein a plurality of mounting portions for mounting the separated seating members onto the engine are provided in a crosswise direction, and the center of gravity of the case is configured to be located at a location approximately corresponding to the center of the plurality of mounting portions.

8. The compressor according to claim 1, wherein a latch portion is provided between the separated seating members and the case, for latching each other in a prescribed direction.

9. The compressor according to claim 1, wherein the separated seating members are made of aluminum alloy.

10. The compressor according to claim 1, wherein the elastic member is made of rubber.

* * * * *

UNITED STATES PATENT AND TRADEMARK OFFICE
CERTIFICATE OF CORRECTION

PATENT NO. : 6,669,452 B2
DATED : December 30, 2003
INVENTOR(S) : N. Ogawa et al.

It is certified that error appears in the above-identified patent and that said Letters Patent is hereby corrected as shown below:

<u>Title page,</u>
Item [30], Foreign Application Priority Data, "2000-071735" should be -- 2001-071735 --.

Signed and Sealed this

Fourteenth Day of September, 2004

JON W. DUDAS
*Director of the United States Patent and Trademark Office*